United States Patent
Bonnstauffer

(10) Patent No.: US 9,058,942 B2
(45) Date of Patent: Jun. 16, 2015

(54) MULTI-CHAMBER KEYS

(71) Applicant: William Bonnstauffer, Staten Island, NY (US)

(72) Inventor: William Bonnstauffer, Staten Island, NY (US)

(*) Notice: Subject to any disclaimer, the term of this patent is extended or adjusted under 35 U.S.C. 154(b) by 0 days.

(21) Appl. No.: 14/217,823

(22) Filed: Mar. 18, 2014

(65) Prior Publication Data

US 2014/0299454 A1 Oct. 9, 2014

Related U.S. Application Data

(60) Provisional application No. 61/807,984, filed on Apr. 3, 2013.

(51) Int. Cl.
| | |
|---|---|
| *H01H 13/705* | (2006.01) |
| *H01H 13/14* | (2006.01) |
| *H01H 13/84* | (2006.01) |
| *G06F 3/02* | (2006.01) |
| *G06F 3/033* | (2013.01) |

(52) U.S. Cl.
CPC .......... *H01H 13/14* (2013.01); *H01H 2217/044* (2013.01); *H01H 13/84* (2013.01); *H01H 2233/07* (2013.01); *G06F 3/033* (2013.01); *H01H 13/705* (2013.01); *G06F 3/0202* (2013.01)

(58) Field of Classification Search
CPC .......... H01H 2217/044; H01H 13/705; H01H 2233/07; G06F 3/0202; A47B 21/0378
See application file for complete search history.

(56) References Cited

U.S. PATENT DOCUMENTS

| | | | | |
|---|---|---|---|---|
| 4,679,030 | A * | 7/1987 | Volnak | 341/26 |
| 5,290,115 | A | 3/1994 | Little | |
| 5,655,947 | A * | 8/1997 | Chen | 446/46 |
| 5,678,266 | A * | 10/1997 | Petringa et al. | 5/655.5 |
| 5,813,777 | A | 9/1998 | Bonnstauffer | |
| 5,933,133 | A | 8/1999 | Lohr | |
| 6,016,138 | A * | 1/2000 | Harskamp et al. | 345/163 |
| 6,497,521 | B1 | 12/2002 | Lohr | |
| 6,677,026 | B1 * | 1/2004 | Yates | 428/137 |
| 7,040,824 | B2 | 5/2006 | Schaffner | |
| 8,132,976 | B2 | 3/2012 | Odell et al. | |
| 8,278,579 | B2 | 10/2012 | Lin et al. | H01H 13/705 |
| 2006/0056898 | A1 | 3/2006 | Schaffner | G06F 3/0202 |
| 2008/0205961 | A1 | 8/2008 | Stachurski | |
| 2009/0002205 | A1 * | 1/2009 | Klinghult et al. | 341/33 |
| 2011/0298705 | A1 * | 12/2011 | Vaganov | 345/156 |

FOREIGN PATENT DOCUMENTS

| | | | | |
|---|---|---|---|---|
| DE | 10300619 | A1 * | 7/2004 | G05G 1/00 |
| JP | 60011376 | A * | 1/1985 | B41J 5/12 |
| JP | 06202777 | A * | 7/1994 | G06F 3/02 |
| JP | 10247438 | A * | 9/1998 | H01H 13/70 |

OTHER PUBLICATIONS

International Search Report and Written Opinion dated Jan. 26, 2015 in related PCT Application No. PCT/US14/41785 filed Jun. 10, 2014 (8 pages).

* cited by examiner

*Primary Examiner* — Daniel J Colilla
(74) *Attorney, Agent, or Firm* — Dentons US LLP

(57) ABSTRACT

A device comprises a key containing an upper closed chamber with a first gel and a lower closed chamber with a second gel. The key contains a divider portion interposedly common to the upper chamber and the lower chamber. The portion laterally traverses the key.

14 Claims, 11 Drawing Sheets

MULTI-CHAMBER KEYS

CROSS-REFERENCE TO RELATED APPLICATIONS

The present application claims priority to U.S. Provisional Patent Application Ser. No. 61/807,984, filed on Apr. 3, 2013, which is herein fully incorporated by reference for all purposes.

TECHNICAL FIELD

Generally, the present disclosure relates to keys. More particularly, the present disclosure relates to multi-chamber keys.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to an attempt to solve any problem with which the present disclosure is concerned.

Carpal tunnel syndrome (CTS) is a medical condition affecting many people worldwide. CTS is commonly believed to result from a combination of factors. One of such factors often involves extensive computer keyboard use. Resultantly, whether at workplace, at school and/or at home, many computer keyboard users are advised to adjust their surroundings, reduce stress on hands/wrists, position themselves properly and/or perform hands/wrists exercises. Similarly, at least due to potential reduction in worker productivity, many corporations are now taking action, such as modifying/replacing work equipment and/or changing work operations, in order to reduce occurrences of CTS. Although such advice and/or action have been somewhat effective, many people still suffer from CTS.

While certain aspects of conventional technologies have been discussed to facilitate the present disclosure, no technical aspects are disclaimed. The claims may encompass one and/or more of the conventional technical aspects discussed herein.

BRIEF SUMMARY

According to an example embodiment of the present disclosure a device comprises a key containing an upper closed chamber with a first gel and a lower closed chamber with a second gel. The key contains a divider portion interposedly common to the upper chamber and the lower chamber. The portion laterally traverses the key.

The present disclosure may be embodied in the form illustrated in the accompanying drawings. Attention is called to the fact, however, that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

DETAILED DESCRIPTION OF THE PREFERRED EMBODIMENTS

Figure 1:
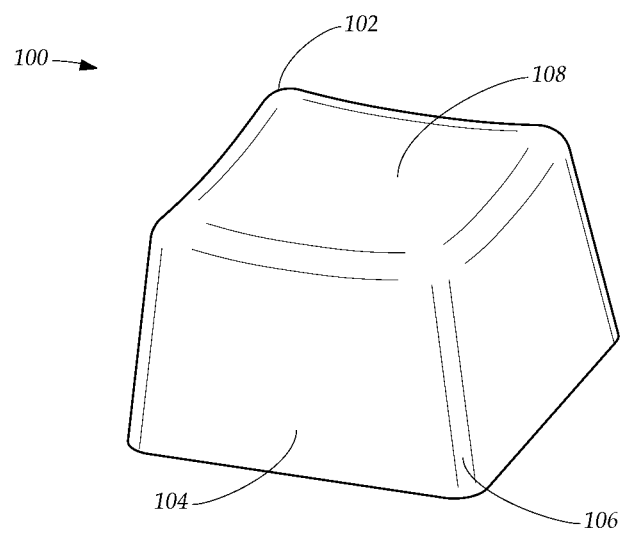
FIG. 1 shows a perspective view of an example embodiment of a computer keyboard key according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, reflection, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a perspective view of an example embodiment of a computer keyboard key according to the present disclosure.

A key 100 includes a key body 102 having a plurality of sidewalls 104 meeting at a plurality of corners 106. Body 102 also includes a top surface 108 from which sidewalls 104 extend downwardly therefrom. Sidewalls 104, corners 106 and/or surface 108 can be unitary and/or an assembly. Whether inwardly and/or outwardly, any and/or entire portion of at least one of corners 106 can be rounded, curved or sharp. Sidewalls 104 can be a single wall as well. In other embodiments, corners 106 are lacking, such as when body 102 is cylindrically shaped.

Key 100 can be any key on any keyboard irrespective of keyboard illumination, keyboard function, such as standard size, laptop size, thumb-size or others, keyboard structure, whether foldable or non-foldable, keyboard layout, such as QWERTY, AZERTY or others, key function, such as an alphanumeric key, a function key, a bar key, a direction key, an enter key, a shift key, and any other computer keyboard key, device type, such as a calculator, whether handheld, portable, desktop, and/or pocket, a typewriter, a desktop computer, a computer mouse, whether wired and/or wireless, a workstation, a computer kiosk, a piano, an accordion, an organ, a mobile phone, a cash register, a point-of-sale system, an automobile, an appliance or others. Key 100 can be waterproof.

Body 102 has an upright trapezoidal cross-section. However, in other example embodiments, body 102 can have a non-upright trapezoidal cross-section, such as a flipped trapezoid or a sideways-turned trapezoid, or a non-trapezoidal cross-section, such as a square cross-section or a rectangular cross-section. Sidewalls 104 are outwardly beveled with respect to surface 108. However, in other example embodiments, at least one of sidewalls 104 can be inwardly beveled with respect to surface 108 or can be perpendicular to surface 108. Although surface 108 is concave i.e. curves inward to form a dimple, surface 108 can also be convex i.e. curve outward to form a hemispherical cap, whether hollow or non-hollow, or not project all, such as be rectilinearly flat. Surface 108 can be wavy, curvy, zigzag, teethed, linear and/or others.

Surface 108, at least one of corners 106 and/or at least one of walls 104 can be coated and/or include an anti-bacterial and/or anti-mold coating. Surface 108 can also include at least one user identifiable symbol, such as an alphanumeric character, a string, a plurality of strings and/or others, irrespective of how the symbol is associated with surface 108, such as a sticker, an ink/paint, or manufactured with the symbol thereon, such as via embedding.

Figure 2:
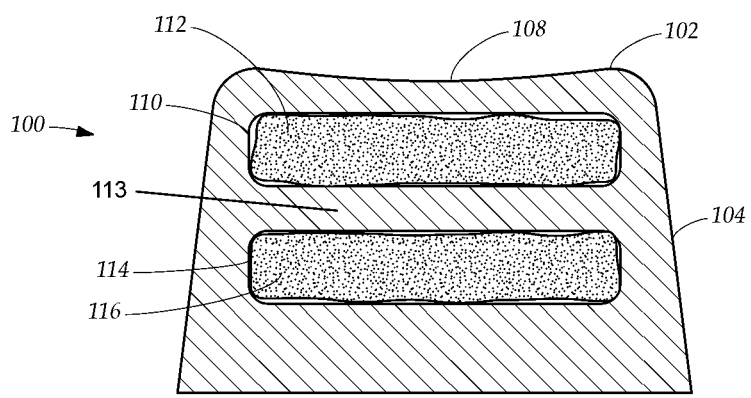
FIG. 2 shows a cross-sectional view of an example embodiment of a computer keyboard key having an upper chamber and a lower chamber according to the present disclosure.

FIG. 2 shows a cross-sectional view of an example embodiment of a computer keyboard key having an upper chamber and a lower chamber according to the present disclosure. Some elements of this figure are described above. Thus, same and/or similar reference characters identify same and/or like components described above and any repetitive detailed description thereof will hereinafter be omitted or simplified in order to avoid complication.

Body 102 contains an upper chamber 110 and a lower chamber 114, both of which are enclosed by sidewalls 104 and are below surface 108. A divider 113, such as a floor, separates chamber 110 and chamber 114. Divider 113 is rigid, but can be flexible. Divider 113 can be unitary with respect to at least one of sidewalls 104 and/or at least one of corners 106. Divider 113 can be as long, wide and/or deep as at least one of chamber 110 and chamber 114. However, in other example embodiments, divider 113 is different in length, width and/or depth, whether shorter or longer, than at least one of chamber 110 and chamber 114. Divider 113 precludes fluid communication between chamber 110 and chamber 114.

Chamber 110 is disposed over chamber 114. Such disposal can be offset, non-aligned and/or off-center, such as chamber 110 and chamber 114 are offset with each other, non-aligned with each other and/or off-center with each other. However, in other example embodiments, such disposal can allow for chamber 110 and chamber 114 to be non-offset, share a common center and/or be aligned with each other. Chamber 110 and chamber 114 extend linearly within body 102. However, in other example embodiments, chamber 110 and/or chamber 114 can extend non-linearly within body 102, such as be sloped upwardly or downwardly, wavy, zigzag, curved and/or other ways. Chamber 110 and chamber 114 have rectangular cross-sections. However, in other example embodiments, chamber 110 and/or chamber 114 can have non-rectangular cross-sections, such as square, circular, oval, trapezoidal, pentagonal, octagonal and/or others. Chamber 110 and chamber 114 have linear sidewalls. However, in other example embodiments, chamber 110 and/or chamber 110 can have non-linear sidewalls, such as curved, wavy, zigzag and/or others. Chamber 110 can be identical in at least one of shape, size, length, width, depth, internal surface and volume to chamber 114. However, in other example embodiments, chamber 110 is different in at least one of shape, size, length, width, depth, internal surface and volume from chamber 114. Chamber 110 is fully enclosed, imperforate and isolated from ambient air and chamber 114. Chamber 114 is fully enclosed, imperforate and isolated from ambient air and chamber 110.

Chamber 110 contains a first gel 112, such as silicon. Chamber 114 contains a second gel 116, such as silicon. Gel 112 can be identical to gel 116, whether in chemical constitution, functional properties, volume and/or others. However, in other example embodiments, gel 112 can be different from gel 116, whether in chemical constitution, functional properties, volume and/or others. Chamber 110 can be fully filled with gel 112. However, in other example embodiments, chamber 112 can be less than full i.e. partially filled with gel 112, such as half or more or less than half. Chamber 114 can be fully filled with gel 116. However, in other example embodiments, chamber 114 can be less than full i.e. partially filled with gel 116, such as half or more or less than half. At least one of gel 112 and gel 116 can be a deformable cushion gel. Chamber 110 can contain gel 112 in identical amount as chamber 114 contains gel 116. However, in other example embodiments, chamber 110 can contain gel 112 in different amount than chamber 114 contains gel 116. At least one of gel 112 and gel 114 can be a mixture of gels. Rubber can be used instead of at least one of gel 112 and gel 116.

The presence of at least chamber 110 containing gel 112 and chamber 114 containing gel 116 may contribute to key 100 being easier and/or softer to press, which may reduce and/or soften impact to a user suffering from CTS. Also, such key structure may reduce the likelihood of occurrence of CTS. Moreover, such key structure may improve shock absorbency when the user presses key 100. Further, such key structure may bolster the strength of the divider between chamber 110 and chamber 114 when the user presses on key 100 many times since gel 116 can press upward when the pressure is applied to key 100 by the user pressing key 100. Note that divider 113 is sufficiently strong/reinforced to preclude breaking/puncturing therethrough upon repeated pressing of key 100.

Chamber 110 and chamber 114 can include sub-chambers sectioned off in any way, whether identical to each other with respect to the respective chamber or non-identical to each other with respect to the respective chamber, whether identical to each other with respect to the respective chambers or non-identical to each other with respect to the respective chambers. The sub-chambers can include a plurality of gels, identical to each other or different from each other in any way, whether in chemical constitution, functional properties, volume and/or others. The sub-chambers can be divided via at least one divider extending in at least one direction, such as vertical, diagonal and/or vertical.

Figure 3A:
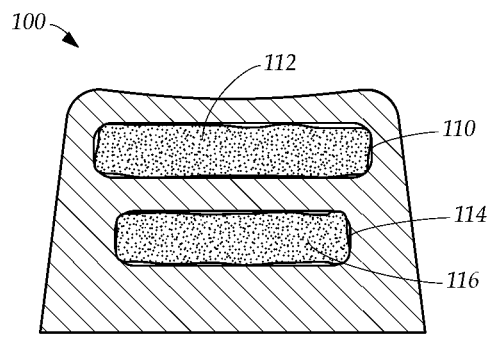
FIG. 3A shows a cross-sectional view of an example embodiment of a computer keyboard key having an upper chamber more voluminous than a lower chamber than according to the present disclosure.

FIG. 3A shows a cross-sectional view of an example embodiment of a computer keyboard key having an upper chamber more voluminous than a lower chamber than according to the present disclosure. Some elements of this figure are described above. Thus, same and/or similar reference characters identify same and/or like components described above and any repetitive detailed description thereof will hereinafter be omitted or simplified in order to avoid complication.

Note that chamber 110 has a larger cross section than chamber 114. Nevertheless, gel 112 and gel 116 can be equal in volume or non-equal in volume, such as gel 112 having more volume than gel 116 or gel 112 having less volume than gel 116.

Figure 3B:
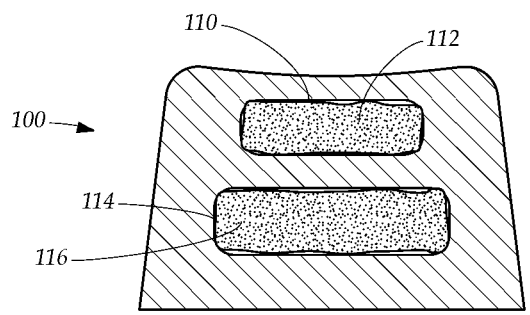
FIG. 3B shows a cross-sectional view of an example embodiment of a computer keyboard key having an upper chamber less voluminous than a lower chamber than according to the present disclosure.

FIG. 3B shows a cross-sectional view of an example embodiment of a computer keyboard key having an upper chamber less voluminous than a lower chamber than according to the present disclosure. Some elements of this figure are described above. Thus, same and/or similar reference characters identify same and/or like components described above and any repetitive detailed description thereof will hereinafter be omitted or simplified in order to avoid complication.

Note that chamber 110 has a smaller cross section than chamber 114. Nevertheless, gel 112 and gel 116 can be equal in volume or non-equal in volume, such as gel 112 having more volume than gel 116 or gel 112 having less volume than gel 116.

Figure 4A:
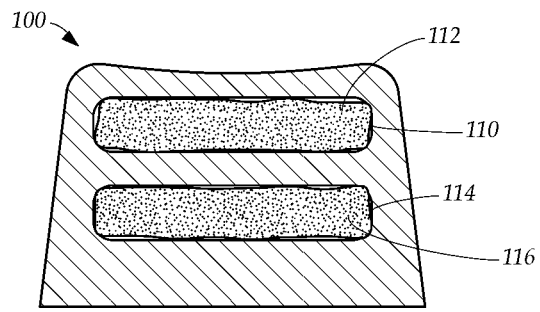
FIG. 4A shows a cross-sectional view of an example embodiment of a computer keyboard key where cushion gels are identical to each other according to the present disclosure.

FIG. 4A shows a cross-sectional view of an example embodiment of a computer keyboard key where cushion gels are identical to each other according to the present disclosure. Some elements of this figure are described above. Thus, same and/or similar reference characters identify same and/or like components described above and any repetitive detailed description thereof will hereinafter be omitted or simplified in order to avoid complication.

Note that gel 112 and gel 114 have an identical chemical constitution, whether in viscosity and/or chemical make-up.

Figure 4B:
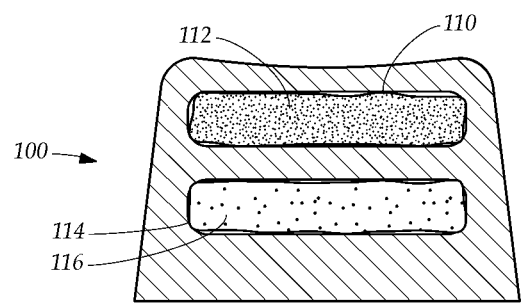
FIG. 4B shows a cross-sectional view of an example embodiment of a computer keyboard key where cushion gels are different from each other according to the present disclosure.

FIG. 4B shows a cross-sectional view of an example embodiment of a computer keyboard key where cushion gels are different from each other according to the present disclosure. Some elements of this figure are described above. Thus, same and/or similar reference characters identify same and/or like components described above and any repetitive detailed description thereof will hereinafter be omitted or simplified in order to avoid complication.

Note that gel 112 and gel 114 differ in chemical constitution, which can include different viscosities of an identical chemical make-up or a different chemical make-up irrespective of gel viscosity.

Figure 5A:
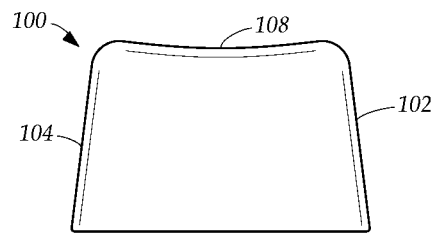
FIG. 5A shows a side view of an example embodiment of a computer key having inclined sidewalls and a curved top surface according to the present disclosure.

FIG. 5A shows a side view of an example embodiment of a computer key having inclined sidewalls and a curved top surface according to the present disclosure. Some elements of this figure are described above. Thus, same and/or similar reference characters identify same and/or like components described above and any repetitive detailed description thereof will hereinafter be omitted or simplified in order to avoid complication.

Note that walls 104 are non-parallel and outwardly beveled. Surface 108 is concave i.e. curves inward to form a dimple. However, in other example embodiments, walls 104 can be inwardly beveled or be perpendicular, via being parallel to each other, to surface 108, which can be linear or convex.

Figure 5B:
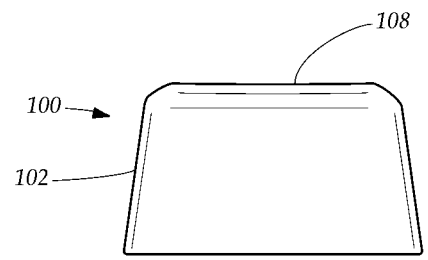
FIG. 5B shows a side view of an example embodiment of a computer key having inclined sidewalls and a linear top surface according to the present disclosure.

FIG. 5B shows a side view of an example embodiment of a computer key having inclined sidewalls and a linear top surface according to the present disclosure. Some elements of this figure are described above. Thus, same and/or similar reference characters identify same and/or like components described above and any repetitive detailed description thereof will hereinafter be omitted or simplified in order to avoid complication.

Note that surface 108 is rectilinear.

Figure 5C:
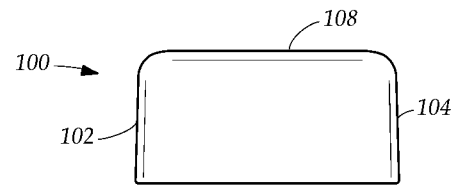
FIG. 5C a side view of an example embodiment of a computer key having non-inclined sidewalls and a linear top surface according to the present disclosure.

FIG. 5C a side view of an example embodiment of a computer key having non-inclined sidewalls and a linear top surface according to the present disclosure. Some elements of this figure are described above. Thus, same and/or similar reference characters identify same and/or like components described above and any repetitive detailed description thereof will hereinafter be omitted or simplified in order to avoid complication.

Note that walls 104 are rectilinear and parallel to each other.

Figure 6:
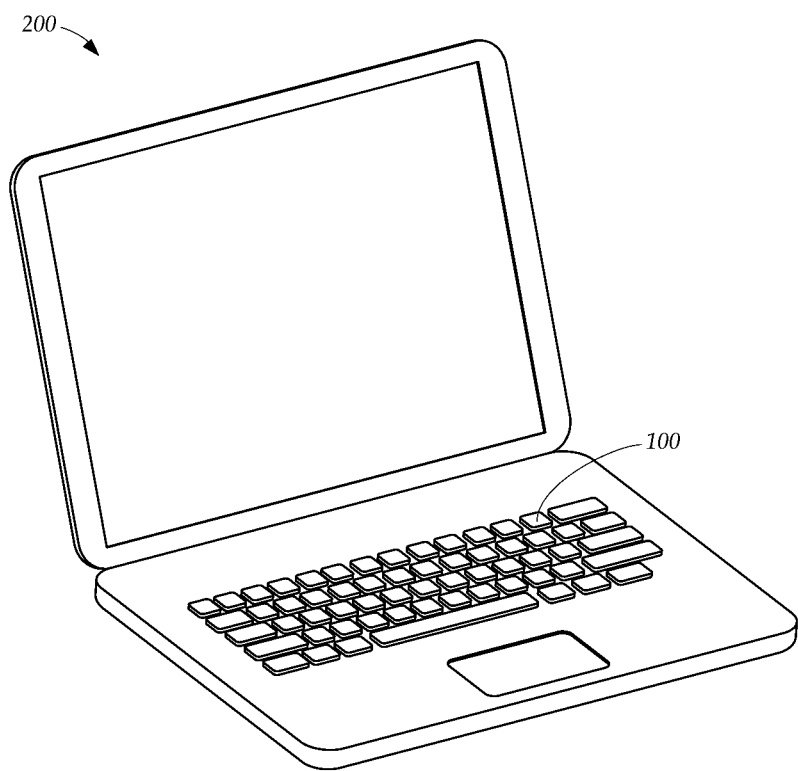
FIG. 6 shows a perspective view of an example embodiment of a laptop computer having a key with at least two chambers according to the present disclosure.

FIG. 6 shows a perspective view of an example embodiment of a laptop computer having a key with at least two chambers according to the present disclosure. Some elements of this figure are described above. Thus, same and/or similar reference characters identify same and/or like components described above and any repetitive detailed description thereof will hereinafter be omitted or simplified in order to avoid complication.

A laptop computer 200 includes a keyboard having a plurality of keys. At least one of the keys is key 100. Any and/or all of the keys can be structured identically to or similar to key 100. For example, some keys can have multiple gel filled chambers and other keys can have a pair of gel filled chambers and yet other keys can have differently sized gel filled chambers and still other keys can have a plurality of chambers containing different gels, whether different in volume or chemical make-up.

Figure 7:
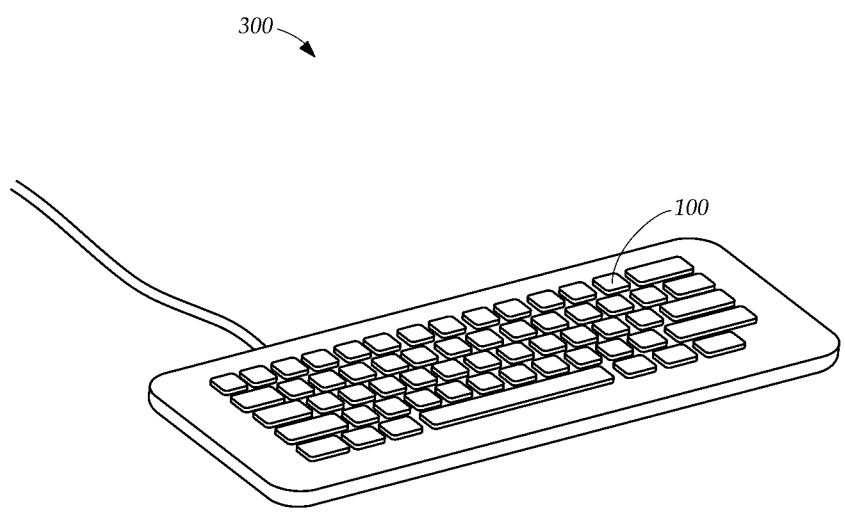
FIG. 7 shows a perspective view of an example embodiment of a wired computer keyboard having a key with at least two chambers according to the present disclosure.

FIG. 7 shows a perspective view of an example embodiment of a wired computer keyboard having a key with at least two chambers according to the present disclosure. Some elements of this figure are described above. Thus, same and/or similar reference characters identify same and/or like components described above and any repetitive detailed description thereof will hereinafter be omitted or simplified in order to avoid complication.

A wired keyboard 300 has a plurality of keys. At least one of the keys is key 100. Any and/or all of the keys can be structured identically to or similar to key 100. For example, some keys can have multiple gel filled chambers and other keys can have a pair of gel filled chambers and yet other keys can have differently sized gel filled chambers and still other keys can have a plurality of chambers containing different gels, whether different in volume or chemical make-up.

Figure 8:
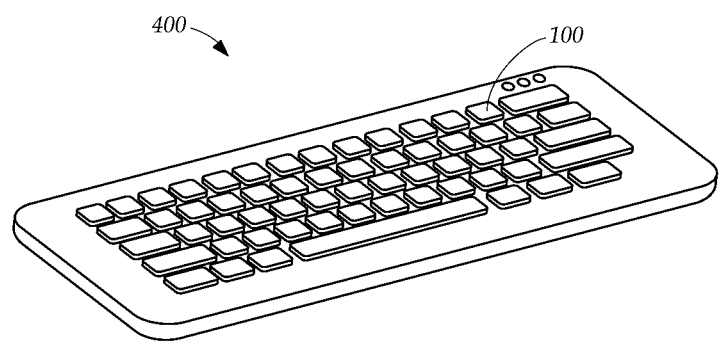
FIG. 8 shows a perspective view of an example embodiment of a wireless computer keyboard having a key with at least two chambers according to the present disclosure.

FIG. 8 shows a perspective view of an example embodiment of a wireless computer keyboard having a key with at least two chambers according to the present disclosure. Some elements of this figure are described above. Thus, same and/or similar reference characters identify same and/or like components described above and any repetitive detailed description thereof will hereinafter be omitted or simplified in order to avoid complication.

A wireless keyboard 400 has a plurality of keys. At least one of the keys is key 100. Any and/or all of the keys can be structured identically to or similar to key 100. For example, some keys can have multiple gel filled chambers and other keys can have a pair of gel filled chambers and yet other keys can have differently sized gel filled chambers and still other keys can have a plurality of chambers containing different gels, whether different in volume or chemical make-up.

Figure 9:
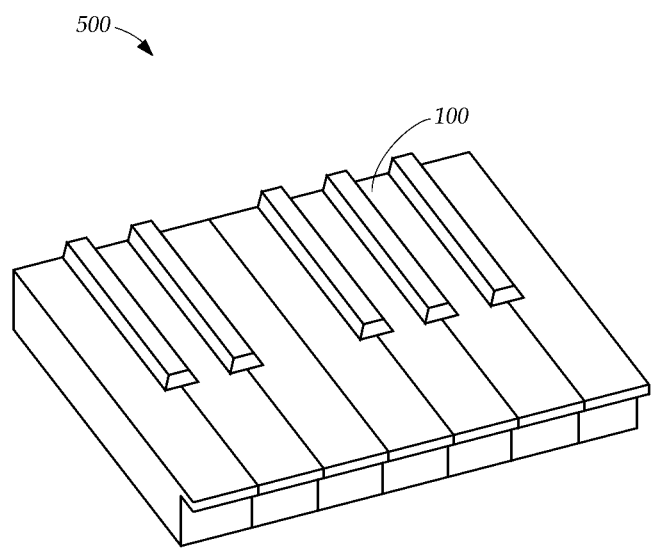
FIG. 9 shows a perspective view of an example embodiment of a musical keyboard having a key with at least two chambers according to the present disclosure.

FIG. 9 shows a perspective view of an example embodiment of a musical keyboard having a key with at least two chambers according to the present disclosure. Some elements of this figure are described above. Thus, same and/or similar reference characters identify same and/or like components described above and any repetitive detailed description thereof will hereinafter be omitted or simplified in order to avoid complication.

A musical instrument keyboard 500 has a plurality of keys, which includes at least one of a natural key and an accidental key. At least one of the keys is key 100. Any and/or all of the keys can be structured identically to or similar to key 100. For example, some keys can have multiple gel filled chambers and other keys can have a pair of gel filled chambers and yet other keys can have differently sized gel filled chambers and still other keys can have a plurality of chambers containing different gels, whether different in volume or chemical make-up. The musical instrument can be any instrument including a keyboard, such as a piano, an electronic piano, an organ, an accordion, a keytar and/or others.

Figure 10:
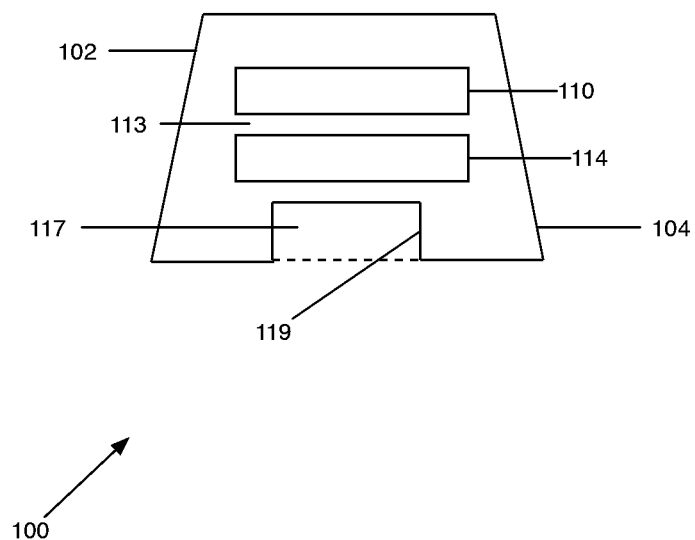
FIG. 10 shows a cross-sectional view of an example embodiment of a computer keyboard key defining an open space below a lower chamber according to the present disclosure.

FIG. 10 shows a cross-sectional view of an example embodiment of a computer keyboard key defining an open space below a lower chamber according to the present disclosure. Some elements of this figure are described above. Thus, same and/or similar reference characters identify same and/or like components described above and any repetitive detailed description thereof will hereinafter be omitted or simplified in order to avoid complication.

Body 102 contains an open space 117 defined via an interior surface 119. Chamber 114 is interposed between chamber 110 and space 117. Space 117 is sized to allow for body 102 to mount onto a key stem. Space 117 is cuboid, but can be shaped in another way, such as trapezoidal. Space 117 is volumetrically smaller than chamber 110 and chamber 114. However, in other embodiments, space 117 is volumetrically larger than at least one of chamber 110 and chamber 114. Surface 119 can include a plurality of grooves or mounds to assist in coupling of key 100 onto the stem.

Figure 11:
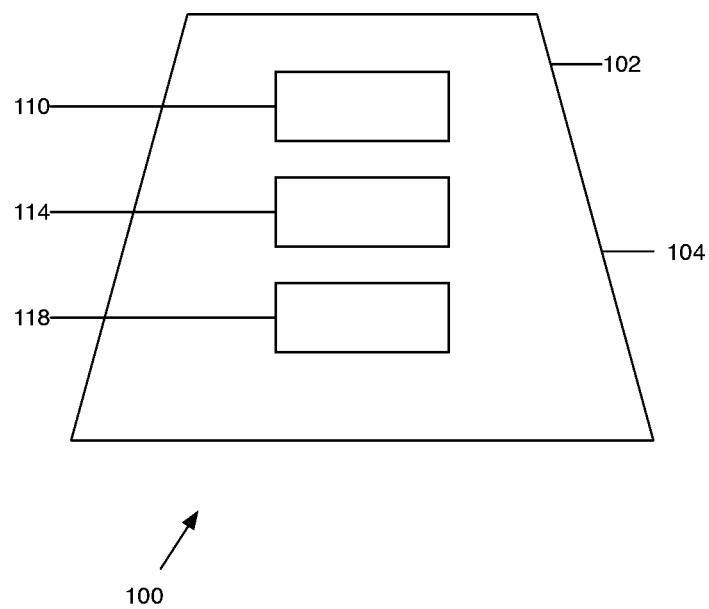
FIG. 11 shows a cross-sectional view of an example embodiment of a computer keyboard key with at least three chambers according to the present disclosure.

FIG. 11 shows a cross-sectional view of an example embodiment of a computer keyboard key with at least three chambers according to the present disclosure. Some elements of this figure are described above. Thus, same and/or similar reference characters identify same and/or like components described above and any repetitive detailed description thereof will hereinafter be omitted or simplified in order to avoid complication.

Body 102 includes a third chamber 118. Chamber 114 is interposed between chamber 110 and chamber 118. Chamber 118 is volumetrically identical to chamber 110 and chamber 118. However, in other embodiments, chamber 118 is different from at least one of chamber 110 and chamber 114 in at least one of size, content, volume, shape, and texture. Chamber 118 contains a third gel, which can be identical to and/or different from at least one of gel 112 and gel 116 in at least one of chemical composition, volume, weight, and texture. The third gel can include silicone. The third gel can be a deformable cushion gel. Note that other embodiments include more chambers, such as four, five or even ten gel filled chambers.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. A device comprising:
   an input interface including a key containing an upper closed chamber with a first gel and a lower closed chamber with a second gel, said key containing a divider portion interposedly common to said upper chamber and said lower chamber, said portion laterally traversing said key, wherein said key includes a top pressing surface, wherein said upper chamber is interposed between said top pressing surface and said portion.

2. The device of claim 1, wherein said key containing a third closed chamber, said lower chamber interposed between said upper chamber and said third chamber.

3. The device of claim 2, said third chamber containing a third gel.

4. The device of claim 1, wherein said key defining an open space underneath said lower chamber, said space adapted to receive a key stem portion.

5. The device of claim 1, wherein said upper chamber and said lower chamber are volumetrically identical to each other.

6. The device of claim 1, wherein said upper chamber and said lower chamber are volumetrically different from each other.

7. The device of claim 1, wherein said upper chamber and said lower chamber are aligned with each other.

8. The device of claim 1, wherein said upper chamber and said lower chamber are misaligned with each other.

9. The device of claim 1, wherein said portion is parallel to at least one of said upper chamber and said lower chamber.

10. The device of claim 1, wherein said first gel and said second gel are identical to each other in at least one of type and volume.

11. The device of claim 1, wherein said first gel and said second gel are different from each other in at least one of type and volume.

12. The device of claim 1, further comprising:
    a keyboard containing said key, wherein the keyboard comprises the input interface.

13. The device of claim 1, further comprising:
    a mouse containing said key, wherein the mouse comprises the input interface.

14. The device of claim 1, further comprising:
    a calculator containing said key, wherein the calculator comprises the input interface.

* * * * *